United States Patent [19]
Bezos

[11] Patent Number: 6,102,491
[45] Date of Patent: Aug. 15, 2000

[54] MULTI-FUNCTION END OF TRAIN DEVICE FOR ELECTRICALLY CONTROLLED PNEUMATIC FREIGHT BRAKE SYSTEM

[75] Inventor: Angel P. Bezos, Rockville, Md.

[73] Assignee: Westinghouse Air Brake Technologies Corporation, Wilmerding, Pa.

[21] Appl. No.: 09/209,488

[22] Filed: Dec. 11, 1998

Related U.S. Application Data

[63] Continuation-in-part of application No. 08/816,527, Mar. 13, 1997, Pat. No. 5,873,638.
[51] Int. Cl.[7] .................................................. B60T 15/46
[52] U.S. Cl. ................. 303/47; 246/169 R; 246/167 R
[58] Field of Search ................................ 303/47, 7, 20; 246/169 R, 167 R, 182 B, 182 C, 196, 182 R; 73/129; 213/1.3, 1.6

[56] References Cited

U.S. PATENT DOCUMENTS

| | | | |
|---|---|---|---|
| 5,039,038 | 8/1991 | Nichols et al. | 246/167 R X |
| 5,267,473 | 12/1993 | Bezos et al. | 73/129 |
| 5,374,015 | 12/1994 | Bezos et al. | 246/169 R |
| 5,377,938 | 1/1995 | Bezos et al. | 246/167 R |
| 5,673,876 | 10/1997 | Lumbis et al. | 246/169 R |
| 5,873,638 | 2/1999 | Bezos | 303/47 |

*Primary Examiner*—Robert J. Oberleitner
*Assistant Examiner*—Melanie Talavera
*Attorney, Agent, or Firm*—Whitham, Curtis & Whitham

[57] ABSTRACT

A multi-function EOT, or universal EOT (UEOT), may function conventionally for those trains not equipped with an ECP power line transceiver but which can automatically change its mode of operation to the ECP EOT function when mounted on trains so equipped. The UEOT may be an integrated unit manufactured for the purpose or it may be implemented as an adapter that converts a conventional two-way end of train unit (EOT) to a UEOT that operates in both standard and ECP modes.

15 Claims, 9 Drawing Sheets

MULTI-FUNCTION END OF TRAIN DEVICE FOR ELECTRICALLY CONTROLLED PNEUMATIC FREIGHT BRAKE SYSTEM

CROSS REFERENCE TO RELATED APPLICATION

This application is a continuation-in-part of application Ser. No. 08/816,527 filed on Mar. 13, 1997, now U.S. Pat. No. 5,873,638, the benefit of the filing date of which is hereby claimed for the commonly disclosed subject matter.

DESCRIPTION

BACKGROUND OF THE INVENTION

1. Field of the Invention

The present invention generally relates to intra-train communications for implementing Electrically Controlled Pneumatic (ECP) railroad freight train brakes and, more particularly, to a multi-function End of Train device (EOT) that operates in a standard mode in which the EOT functions as a normal EOT, in an ECP mode providing ECP functionality in an ECP type of EOT device, or in an emulation mode in which the EOT has 74 V train line power but otherwise functions as a normal EOT.

2. Background Description

End of Train (EOT) signaling and monitoring equipment is now widely used, in place of cabooses, to meet operating and safety requirements of railroads. The information monitored by the EOT typically includes the air pressure of the brake line, battery condition and train movement. A warning light is incorporated into the EOT housing, and the operation of this warning light is also monitored. This information is transmitted to the crew in the locomotive by a battery powered telemetry transmitter.

The original EOT telemetry systems were one-way systems; that is, data was periodically transmitted from the EOT to a Locomotive Control Unit (LCU), sometimes referred to as the Head of Train (HOT) unit, mounted in the locomotive where the information was displayed. Later systems are two-way systems in which transmissions are also made by the LCU to the EOT. In one specific application, the EOT controls an air valve in the train's brake pipe which can be controlled by a transmission from the LCU. In a one-way system, service and emergency brake application starts at the locomotive and progresses along the brake pipe to the end of the train. This process can take significant time in a long train, and if there is a restriction in the brake pipe, the brakes beyond the restriction may not be actuated. With a two-way system emergency braking can be initiated at the end of the train independently of the initiation of emergency braking at the head of the train, and the process or brake application can be considerably shortened. As will be appreciated by those skilled in the art, in order for an LCU to communicate emergency commands to an associated EOT, it is desirable for the EOT to be "armed"; that is, authorized by railroad personnel. This is desirable to prevent one LCU from erroneously or maliciously actuating the emergency brakes in another train. To this end, the LCU includes a nonvolatile memory in which a unique code identifying an EOT unit can be stored. The LCU also has a row of thumb wheel switches which allows manual entry of codes. Additional background on EOT systems may be had by reference to U.S. Pat. Nos. 5,374,015 and 5,377,938, both to Bezos et al. and assigned to the assignee of this application.

The Federal Communication Commission (FCC) allocates blocks of radio frequencies for railroad communications. The Association of American Railroads (AAR) then further allocates the frequencies on a channel basis, which are then used by radio-based intra-train communications systems. The AAR develops standards for the railroad industry for, among other things, intra-train communications. Most recently, the AAR is considering an intra-train communication system in which all the cars in a consist are hard wired together. In such a system, power to and communications with the EOT is provided over a cable extending the length of the train. To this end, the AAR has promulgated draft specifications for Electrically Controlled Pneumatic (ECP) Freight Brake Systems, revision #9, Nov. 27, 1996, that requires a special EOT device, hereinafter referred to as an ECP EOT, as specified on page 2, paragraph 2.1.6. As specified in that paragraph, this special ECP EOT will contain a "neuron" chip (a commercially available integrated circuit (IC) chip), a brake pipe pressure transducer and a battery which will be charged off the train line voltage. Presumably, this ECP EOT will also need a standard marker warning light, although the specifications fail to mention this.

Since freight trains can be a mile or more in length, the AAR has determined that the voltage on the cable must be 230 VDC in order to provide adequate power to the ECP EOT. To insure safety of personnel and continuity of the cable, it is necessary to transmit status signals from the ECP EOT to a Head End Unit (HEU) (as distinguished from an LCU in non-ECP EOT systems). First, before the 230 VDC power can be turned on, it is necessary to insure the safety of personnel to make sure that the cable has been properly terminated in the ECP EOT and does not pose a shock hazard. When the cable has been properly terminated, the ECP EOT, under battery power, listens for a beacon from the HEU and, upon detecting a beacon, communicates this to the HEU via the 230 VDC power lines, confirming continuity of the 230 VDC power lines and allowing the engineer to turn the 230 VDC power on or allowing the HEU to automatically turn the 230 VDC power on. In addition, since the 230 VDC line could be broken either intentionally or accidentally, the ECP EOT must periodically transmit a status message to insure the continued continuity (i.e., no breaks) of the 230 VDC cable connection, thus further insuring personnel safety.

The AAR specifications suggest that the ECP EOT should be a different unit from the currently manufactured standard two-way EOT, owing in part to the specification for the "neuron" microprocessor and power line modem transceiver and the fact that the cable interface eliminates the need for a high capacity rechargeable battery to power the EOT. However, railroads which use this equipment want to standardize equipment to minimize the logistics of their inventory and maintenance. Manufacturers of the equipment also want to standardize their products in order to improve quality and realize savings.

SUMMARY OF THE INVENTION

It is therefore an object of the present invention to provide a multi-function EOT, or universal EOT (UEOT), that may function conventionally for those trains not equipped with the 230 VDC ECP power line but which can automatically change its mode of operation to the ECP EOT function as defined by the AAR when mounted on trains so equipped.

It is another object of the invention to provide a UEOT with the necessary intelligence to be able to conform to the required multi-functionality automatically when necessary without operator intervention.

According to the invention disclosed in co-pending application Ser. No. 08/816,527, there is provided an electronics package or adapter that conforms to the dimensions of the battery pack of the standard EOT. This adapter plugs into the battery compartment of the standard EOT, making connections with a connector in the battery compartment. When this package is plugged into the battery compartment, the function of the EOT is changed to conform with the ECP EOT function defined by the AAR. This adapter includes a standard ECP connector connected by a cable to the adapter and extending outside the adapter when mounted in the battery compartment. A DC to DC converter reduces a high voltage from the cable to a low voltage and supplies the low voltage to a battery charger which maintains a charge on a small, rechargeable battery. A "neuron" transceiver connected to the cable and powered by the power supply detects when messages are received. Microprocessor electronics connected to the "neuron" transceiver and powered by the power supply responds to the detection from the "neuron" transceiver by transmitting information to the EOT to transmit a status message of the detection to the HEU via the "neuron" transceiver. The firmware of the EOT microprocessor is modified to support the ECP function.

The functionality of the ECP EOT adapter is extended according to another aspect of the invention. This extended functionality is implemented in an integrated Universal EOT, or UEOT, or an UEOT adapter which, like the ECP EOT adapter, is designed to be mounted in the battery compartment of a standard EOT. When the UEOT is mounted, the EOT processor is powered on. The EOT processor sends a signal to turn on a separate microcontroller which, in turn, powers on the "neuron" microprocessor for a first predetermined period of time. The "neuron" microprocessor "listens" for the HEU during this time and if the HEU beacon is received, the EOT starts transmitting once per second for a second predetermined period of time. If the HEU receives the EOT transmissions for a third predetermined period of time, it applies train line power. After this initial power sequence, the UEOT operates in one of a plurality of modes, including the standard mode, the ECP mode and a 74 V emulation mode.

In the standard mode, the UEOT functions as a normal EOT with additional activation of the ECP microcontroller and periodic activation of the "neuron" microprocessor and periodic train line transmissions to the HEU. This is the default mode; that is, the UEOT processor enters the standard mode upon power up and remains in the standard mode until it receives either an HEU beacon or voltage on the train line, at which point the unit switches to the ECP mode. The UEOT will return to the standard mode only if there is no train line voltage and no HEU beacons are received for a predetermined period of time.

In the ECP mode, the UEOT provides the ECP end-of-train status transmissions at a predetermined rate on the train line. These status transmissions contain the prescribed train line voltage, marker status, end-of-train brake pipe pressure, and battery capacity information for the UEOT processor.

If HEU beacons are not received but train line voltage in the range of 74 V is detected, the UEOT enters the 74 V emulation mode in which the UEOT monitors for failure messages from the cars and relays these messages to the HEU via radio communications. While in the emulation mode, the UEOT continues to monitor train line power, and if train line power in the range of 74 V is not detected for a predetermined period of time, the UEOT reverts to standard mode and again listens for HEU beacons.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE PREFERRED EMBODIMENTS OF THE INVENTION

Figure 1:
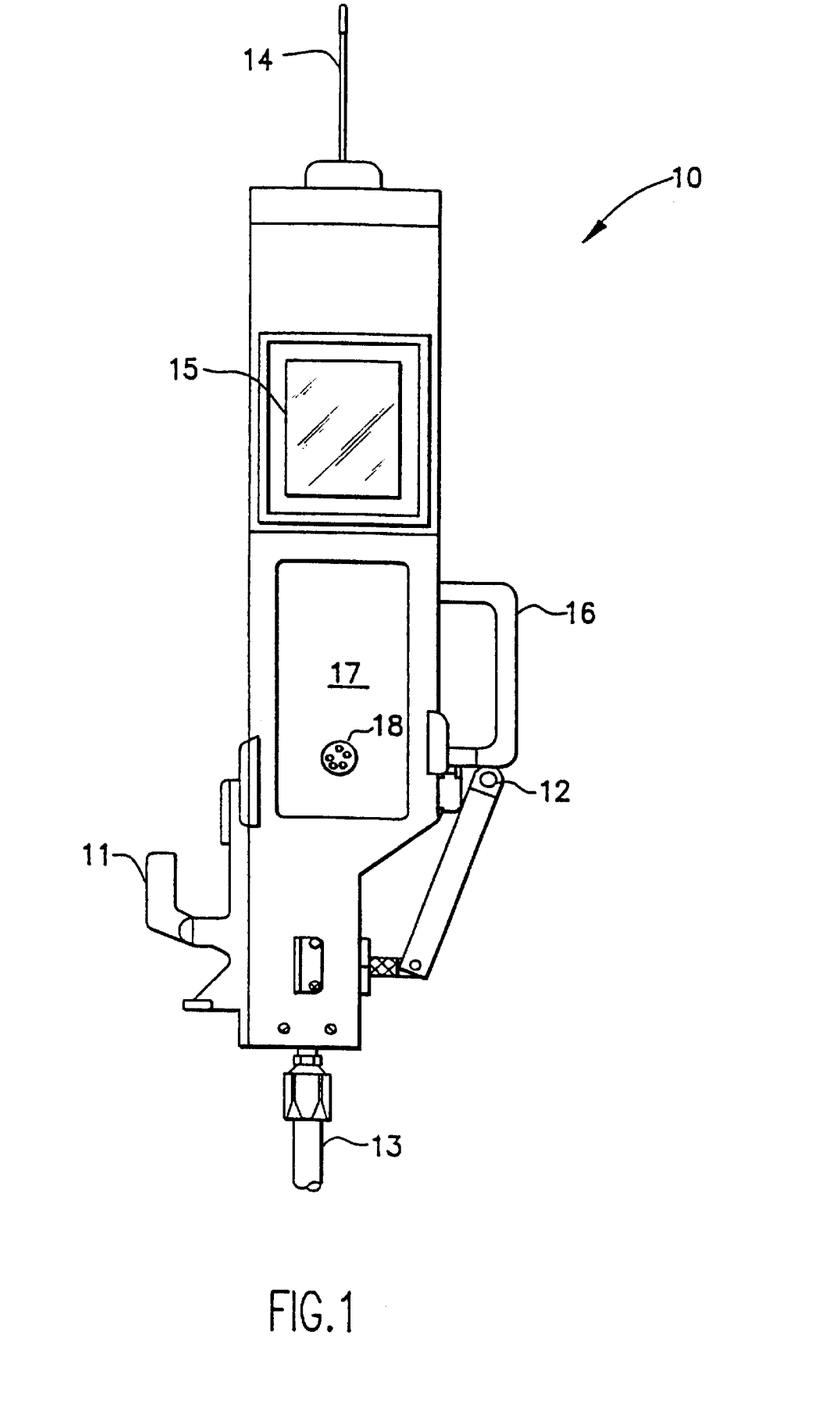
FIG. 1 is an elevation view of a standard two-way EOT showing the location of the battery compartment.

Referring now to the drawings, and more particularly to FIG. 1, there is shown an elevation view of the standard two-way EOT 10 currently manufactured and in widespread use in the railroad industry. The EOT illustrated is manufactured by WABCO Railway Electronics (formerly Pulse Electronics, Inc.), but is representative of two-way EOTs of other manufacturers as well. The EOT 10 is designed to the mounted on the trailing coupler of the last car in the train and is equipped with pressure monitoring and telemetry circuitry. Mounting is by means of a coupler hook mount 11 which engages a coupler and is clamped in place by a coupler mount tightening handle 12. A hose 13 is connected between the train's brake pipe and the EOT unit so that the air pressure of the brake pipe at the end of the train can be monitored.

As shown and described in more detail in U.S. Pat. Nos. 5,374,015 and 5,377,938, the EOT includes a microprocessor control circuit, and a nonvolatile memory in which the control program for the microprocessor controller and a unique identifier code of the particular EOT are stored. The EOT communicates with a radio transceiver of the lead locomotive by way of its own radio transceiver, the antenna 14 for which is installed at the top of the EOT. This transceiver and antenna is operational only when the EOT is used as a standard two-way EOT or in the emulation mode. The EOT is also provided with a marker warning light 15 which flashes periodically and which is monitored by the EOT microprocessor. A carrying handle 16 is provided to allow railroad personnel to carry and mount the EOT 10.

A battery compartment 17 houses a battery pack (not shown) which plugs into the battery compartment. The battery pack includes a heavy duty rechargeable battery, such as lead acid battery or a nickel cadmium battery, and when plugged in, is retained by clamps or fasteners. As shown in FIG. 1, there is an electrical connector 18 in the back of the battery compartment. This connector 18 includes power contacts to which the battery pack is connected when the battery pack is plugged into the battery compartment. The connector 18 also includes additional pins for interconnecting signal lines between the adapter and the EOT electronics.

The AAR ECP EOT specification states that the EOT must be connected to the network and must be transmitting status messages to the HEU before the train line power can be energized. Thus, by implication, the ECP EOT must have its own source of power (e.g., a battery) in order to transmit status messages before the 230 VDC power is turned on.

Figure 2A:
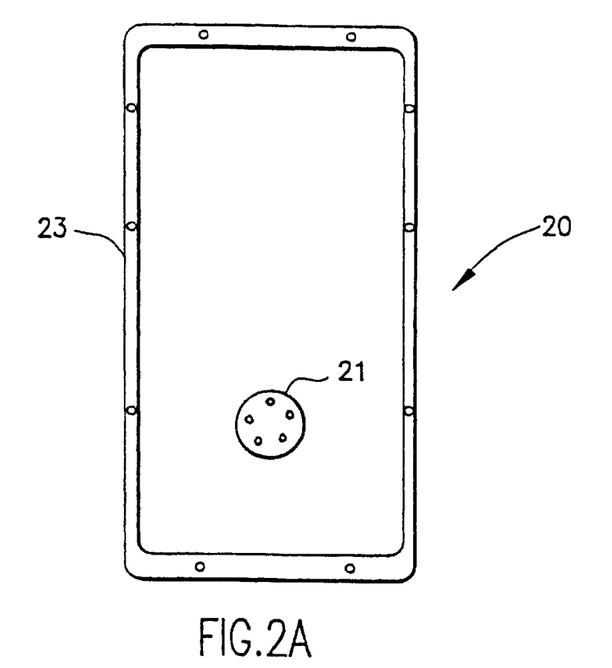
FIGS. 2A and 2B are, respectively, rear and front views of the adapter which plugs directly into the battery compartment of the standard two-way EOT to convert the standard two-way EOT to the ECP EOT specifications of the AAR.
Figure 2B:
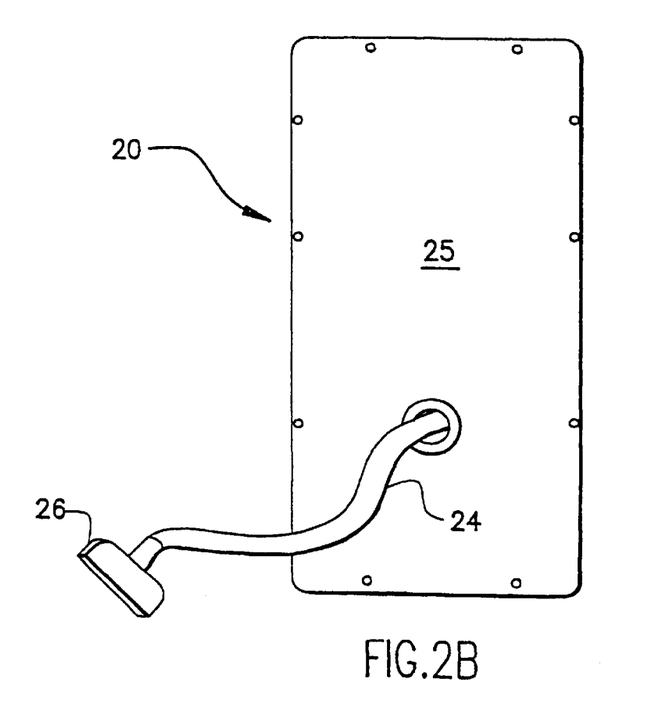

The adapter disclosed in co-pending application Ser. No. 08/816,527 is shown in FIGS 2A and 2B. FIG. 2A shows the rear of the adapter 20 and the mating connector 21 which plugs into connector 18 in the back of the battery compartment 17. A flange 23 surrounding the front face of the battery pack is used to secure the battery pack in the battery compartment 16. FIG 2B shows the front of the adapter 20. A cable 24 emanates from the face plate 25 and is terminated in a 230 VDC connector 26 which is designed to mate with a corresponding connector on the cable installed on the railroad car.

Figure 3:
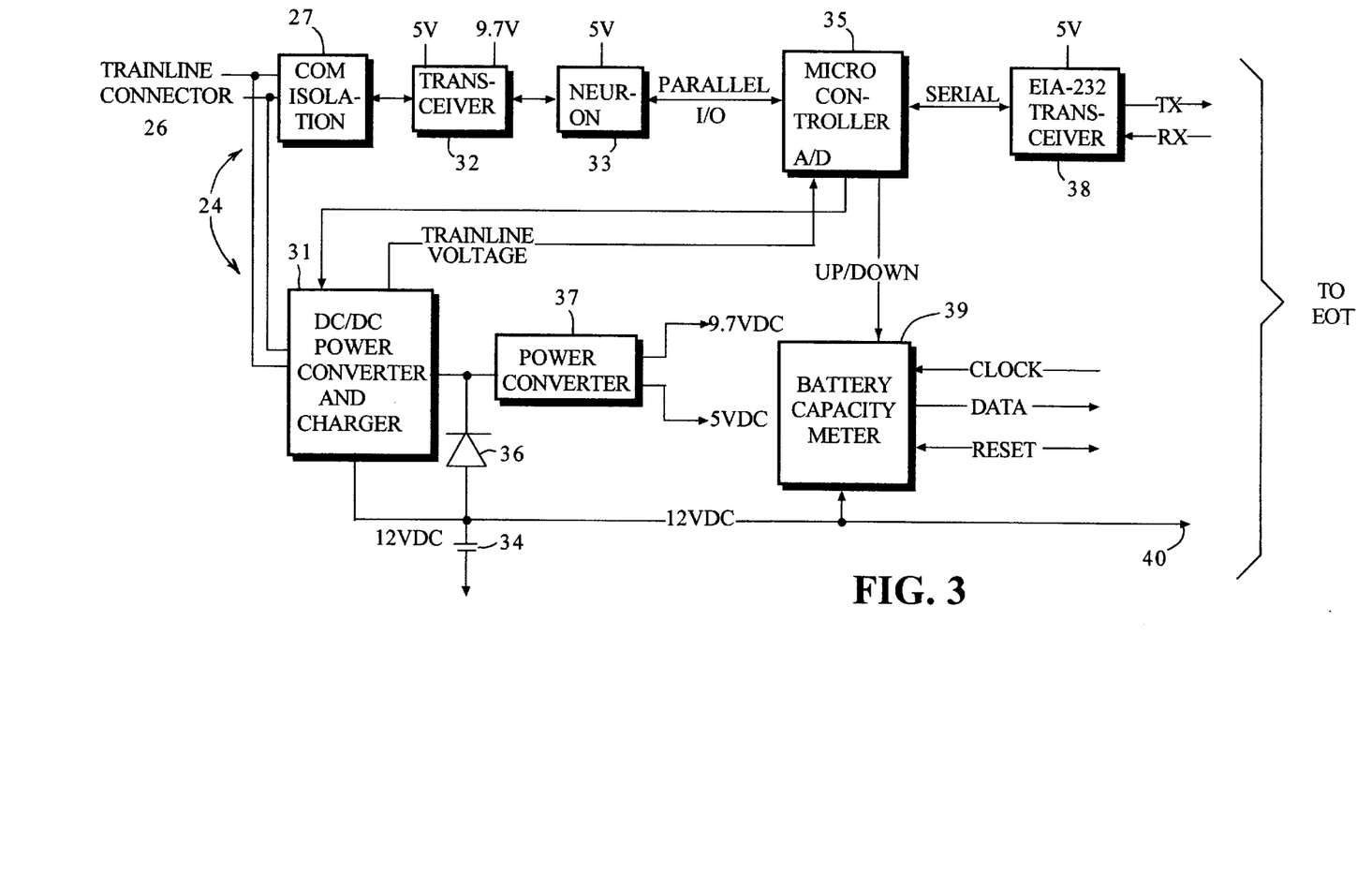
FIG. 3 is a block diagram of the circuitry of the ECP EOT adapter shown in FIG. 2.

FIG. 3 is a block diagram of the adapter electronics. Externally, the ECP 230 VDC connector 26 is connected by the cable 24 to the circuitry of the adapter. The cable 24 provides a 230 VDC connection to a DC to DC converter 31. The cable 24 is also connected via communication isolation 27 to a transceiver 32 which communicates with a "neuron" microprocessor 33, as specified by the AAR. The transceiver 32 and "neuron" microprocessor conform to the specifications of the Echelon Corporation and is comprised of two commercially available components. The first is the "neuron" chip which is a sophisticated very large scale integrated (VLSI) device that incorporates communications, control, scheduling and input/output (I/O) support. The neuron chip enables devices to communicate with one another using the Echelon LonTalk™ protocol which supports distributed, peer-to-peer communication. Neuron chips, model numbers 3120 and 3150, are manufactured and distributed world wide by Motorola and Toshiba. The second component is the PLT-10 power line transceiver module, model 50080, which supports the Echelon LonWorks™ power line communication technology.

The DC to DC converter 31 provides a reduced voltage output to maintains a trickle charge on rechargeable 12 V battery 34. Charging of the battery 34 by the DC to DC converter 31 is controlled by the microcontroller 35. Since batteries are inherently not a high reliability component, it is desirable to maintain dual batteries. This redundancy both increase reliability and capacity. A power converter 37 powered by the battery (or batteries) 34 produces the required voltages to power the transceiver 32 and the "neuron" microprocessor 33. The DC to DC converter 31 also supplies train line voltage to a microcontroller 35. The Schotky diode 36 isolates the battery 34 so that a battery short circuit failure cannot affect the operation of the ECP EOT when the ECP EOT is in the ECP mode, powered by the train line via the DC/DC converter 31.

The battery 34 also provides 12 V power to the EOT microprocessor via connector pin 40. When the adapter is removed from the battery compartment, the battery 34 can be charged by a separate battery charger so that the adapter will be fully ready for the road when plugged into the EOT. Upon completion of the charging of the battery 34, the battery charger resets the battery capacity meter 39.

As with a standard EOT, the batteries of the ECP EOT adaptor must be fully charged before the adaptor is installed in an EOT that is to be installed at the end of an ECP train. The reason is that the ECP functionality needs battery back-up and since one does not know how long the train line power will be "off" prior to departure, the only safe ways to operate is to start with fully charged batteries. There are two ways to charge the batteries of the adaptors.

The primary method of charging adaptor batteries is to use a standard charger which connects to pin 40 of the adaptor. This approach is preferred because operators are familiar with the equipment which give the operator an indication when the batteries are fully charged. The secondary method of charging the batteries is via the train line. A drawback of this approach is that it takes a longer time to charge the batteries.

The connection between the "neuron" microprocessor 33 and the microcontroller 35 is a parallel input/output (I/O) connection. The microcontroller 35 communicates with a transceiver 38, which provides the communication link to the EOT processor and related circuitry, via a serial connection. This serial connection complies with an industry standard, such as the RS232 standard. A battery capacity meter 39 monitors the charge on battery 34 and is controlled by the microcontroller 35 to provide data to the EOT processor and related circuitry. The functions of the battery capacity meter 39 may be incorporated into the microcontroller 35 by suitable firmware. The connections between the transceiver 38 and battery capacity meter 39 and the EOT are made by the mating of connectors 18 and 21 (FIGS. 1 and 2).

Figure 4:
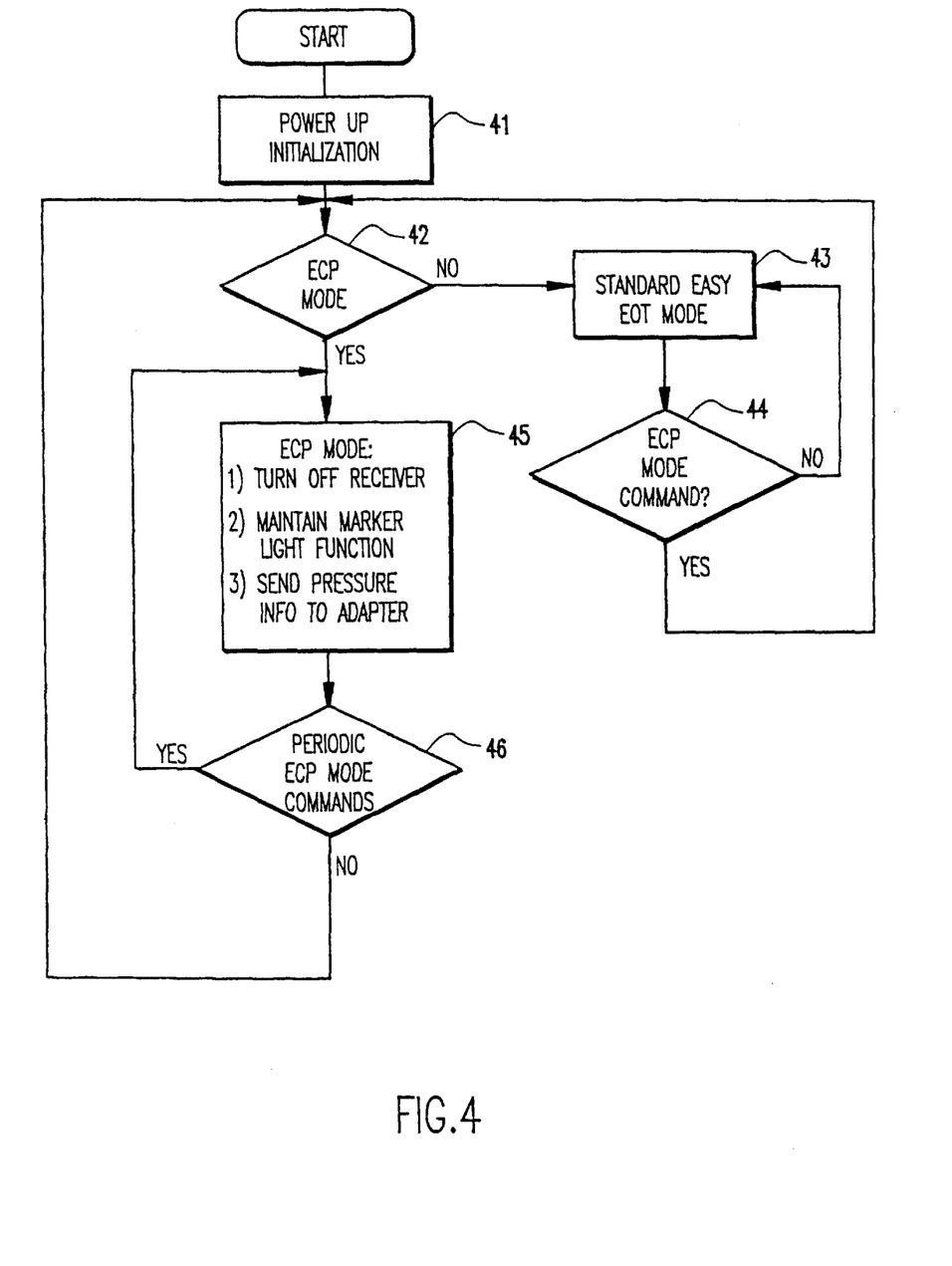
FIG. 4 is a flow chart showing the modification of the firmware for the EOT microprocessor.

The modified firmware of the EOT processor causes the EOT to conform to the multiple functionality. Specifically, when the adapter is plugged into the battery compartment, the connection provides the channel for the adapter to notify the EOT processor of the presence of the adapter. This notification causes the EOT firmware to toggle the operation of the EOT from a standard two-way EOT function to the ECP EOT function. That is, the EOT stops transmitting via its radio transceiver and provides the brake pipe pressure data via the communication isolation 27 connection while maintaining the marker light functionality. Of course, when the EOT does not receive the proper commands via the connection, it functions as a standard two-way EOT. The modified EOT firmware is illustrated in FIG. 4 and described below.

The transceiver 32 detects that the train's 230 VDC cable has been connected to the EOT in a proper and safe termination of the 230 VDC cable. This is communicated to the microcontroller 35 which communicates with the EOT processor via the transceiver 38. In response to a detected connection to the 230 VDC cable, the microcontroller 35 notifies the EOT processor which, in turn, causes status messages to be transmitted to the HEU via the transceiver 32. Only after receiving the status message that the EOT is connected and properly terminating the 230 VDC cable does the HEU cause the 230 VDC power to be turned on.

Once the 230 VDC power is turned on, the EOT continues to function as an ECP EOT. The main piece of information that the ECP EOT needs and that the standard EOT has is the brake pipe pressure. The adapter according to the invention communicates with the standard EOT via the RS232 serial connection and extracts this information from the EOT microprocessor.

Extreme reliability of the ECP EOT is an important aspect of the invention. The reason is that an ECP train cannot operate without a working ECP EOT. A failure of the ECP EOT function will result in a train stoppage and then train operation below 30 MPH until the ECP EOT is fixed. Several features have been incorporated into the ECP EOT adapter to address the reliability aspect. These include the following:

Even if the EOT function fails and the ECP adapter cannot obtain pressure information, the ECP EOT adapter continues in operation since the pressure itself is not a critical parameter in the sense that the train can keep running even if the EOT pressure is not available as long as the ECP EOT communication function can be maintained.

Battery failure will not affect the ECP EOT operation as long as there is 230 VDC power. The diode 36 prevents a battery short circuit from affecting the operation of the ECP EOT adapter.

FIG. 4 is a flow chart illustrating the logic of the modified EOT firmware. The process starts by either a standard battery pack or the ECP adapter being plugged into the battery compartment of the EOT. Power to the EOT microprocessor is turned on either by the act of plugging in the standard battery pack or the ECP adapter or additionally turning on a power switch. In either case, the EOT microprocessor goes through its usual power up initialization in function block 41. Then, in decision block 42, the EOT microprocessor determines whether it is to operate in the ECP mode. If not, the firmware defaults to the standard two-way EOT processing in function block 43. Even after defaulting to standard two-way EOT processing, if an ECP mode command is received, as detected in decision block 44, the process will loop back to decision block 42.

If the EOT microprocessor is to operate in the ECP mode, the process goes to function block 45 where the radio transceiver in the EOT is turned off but the marker light continues to operate. In addition, brake pressure data is supplied to the adapter. A test is made in decision block 46 to determine if periodic ECP mode commands are being received from the adapter. If so, the process continues to loop back to function block 45 to maintain the EOT in ECP mode. If not, the process loops back to decision block 42 to determine if the EOT should default to the standard two-way EOT mode.

When in the ECP mode, the EOT microprocessor obtains a current readings of the brake pipe pressure and transmits this data to the microcontroller 35 shown in FIG. 3. A dedicated microprocessor in the microcontroller 35 formats a message including both the cable connection status and the brake pipe pressure. The formatted message is then transmitted by the microcontroller 35 for modulation and transmission on the 230 VDC line by the neuron microprocessor 33 and transceiver 32. Should continuity be broken, then no further status messages will be formatted and transmitted to the HEU. In that case, a time out function at the HEU would detect this condition and provide a warning to the engineer. It is also possible to provide and additional function at the EOT which, when continuity of the 230 VDC cable is lost, will reactivate the radio transceiver of the EOT and transmit this information to the HEU.

Figure 5:
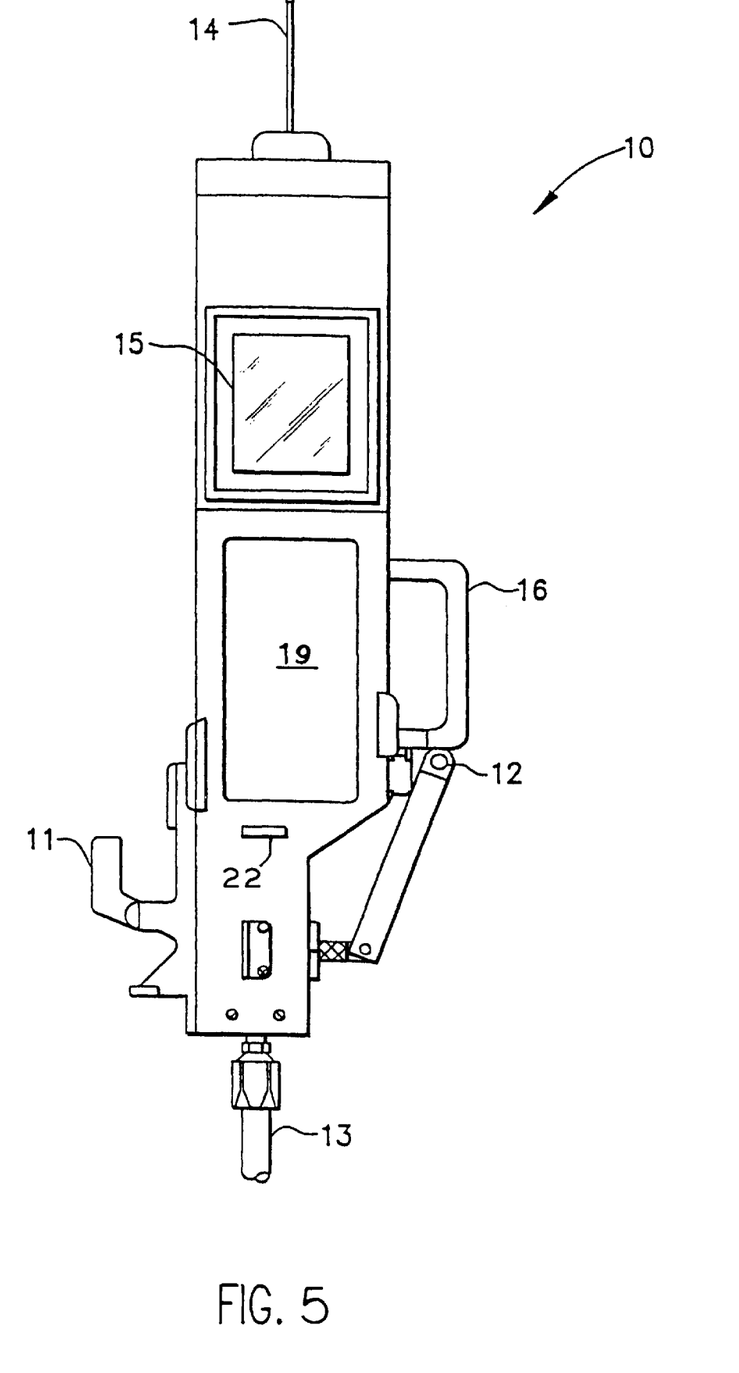
FIG. 5 is an elevation view of the UEOT according to one aspect of the invention.

The concept of a multifunction EOT is further enhanced by a Universal EOT (UEOT). The UEOT monitors the train line and automatically determines its mode of operation. FIG. 5 is an elevation view of the UEOT according to this aspect of the invention. This integrated unit incorporates all the electronics and firmware to operate as a multi-function EOT without need of an adapter. The UEOT is similar in appearance to the standard EOT shown in FIG. 1. A battery access door 19 covers the battery compartment. Built into the UEOT is a connector 22 for making the connection to the ECP 230 VDC line.

Figure 6A:
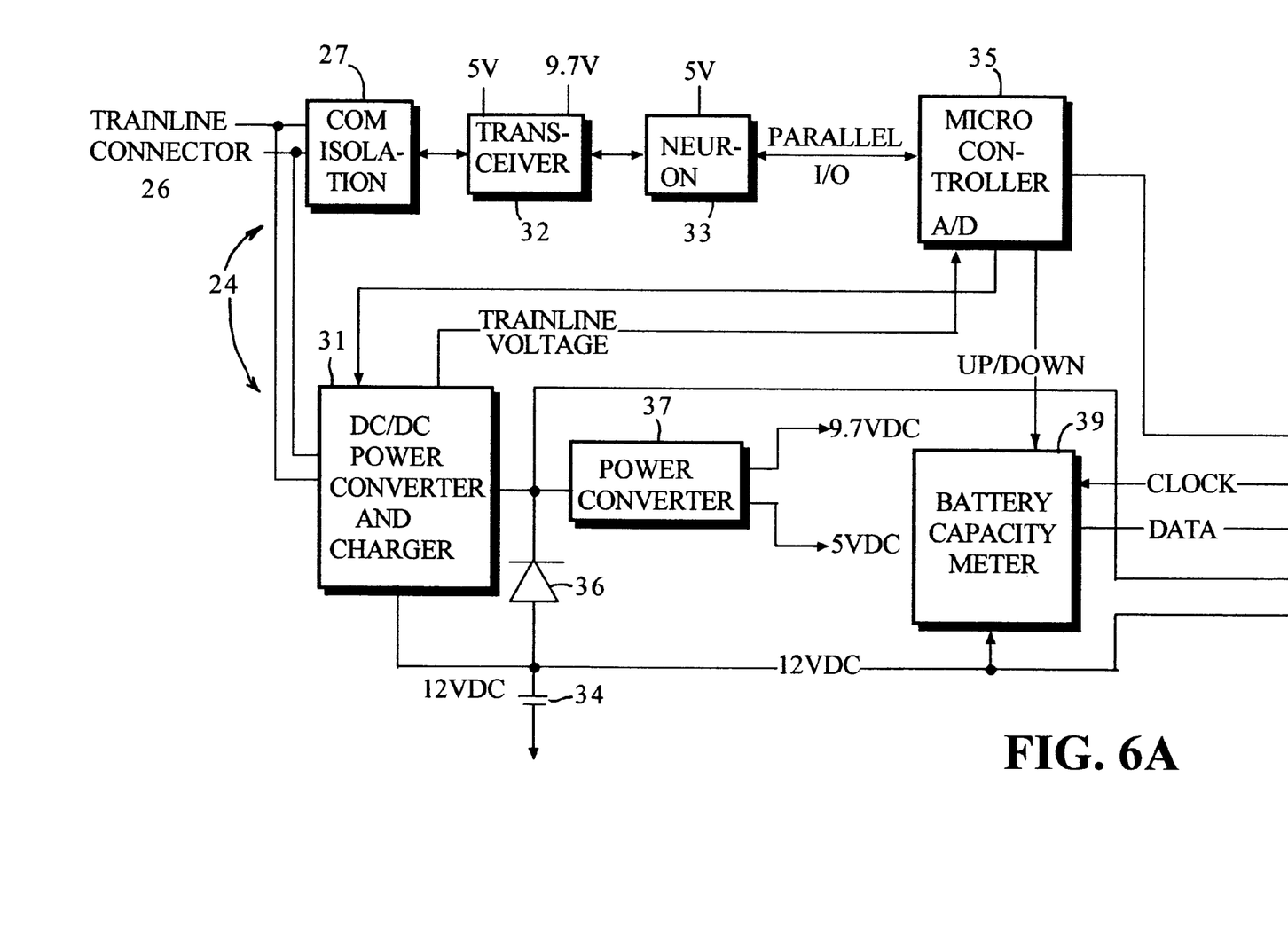
FIG. 6 is a block diagram of the circuitry of the UEOT according to the invention.
Figure 6B:
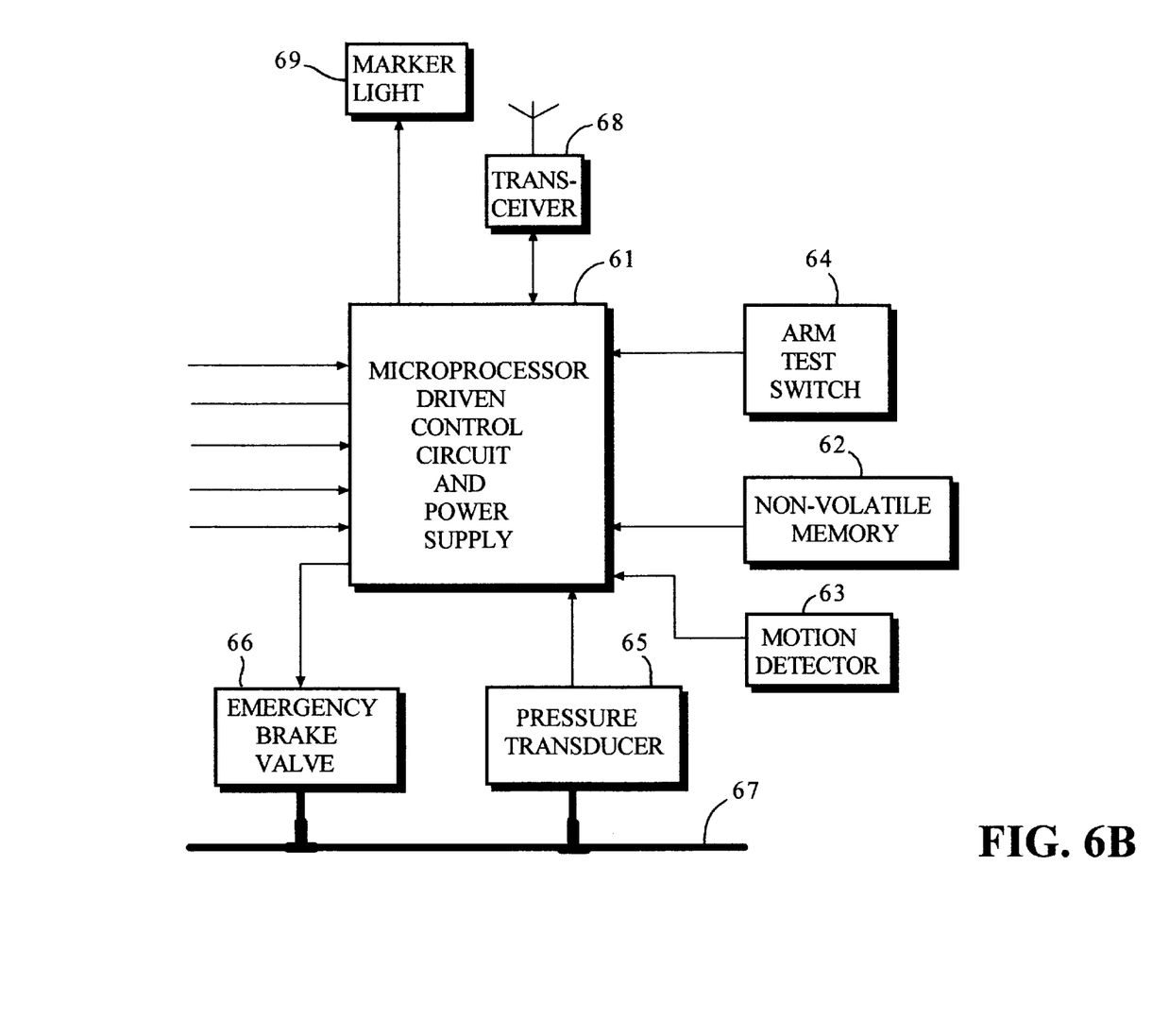

FIG. 6 is a block diagram of the electronics of the UEOT which is similar to that shown in FIG. 3 with the addition of the EOT electronics in a unified package. The DC to DC converter 31 is a dual voltage unit which can be connected to a 230 VDC ECP train line or a 74 VDC non-ECP train line. The converted 31, in either case, produces a 12 VDC output. In FIG. 6, the EOT electronics includes a microprocessor control circuit 61 and a nonvolatile memory 62 in which the control program for the microprocessor controller and a unique identifier code of the particular UEOT are stored. The microprocessor control circuit 61 also has inputs from a motion detector 63, a manually activated arming switch 64 and a brake pressure responsive transducer 65 and an output to an emergency brake control unit 66 coupled to the brake pipe 67. The EOT electronics, when in the standard or emulation modes, communicates via transceiver 68. In all modes, the EOT electronics maintains the function of marker light 69.

The microprocessor driven control circuit 61 includes its own power supply which receives power from the battery 34 and power from DC to DC power converter 31. Thus, there is a built-in redundancy in the power supplies to further enhance the reliability of the unit. This redundancy could be omitted, with the consequential elimination of the reliability afforded by it, and the power for the microprocessor driven control circuit could be solely derived from the power converter 37.

The transceiver 38 (FIG. 3) is not needed in this integrated unit, and communications between the microcontroller 35 and the microprocessor driven control circuit 61 are via a direct microprocessor interrupt. The clock input to the battery capacity meter 39 is supplied by the microprocessor driven control circuit 61, and the data from the battery capacity meter 39 is supplied to the microprocessor driven control circuit 61.

The UEOT man-machine operation remains the same as in the standard EOT with the addition of an ECP status message. The operator mounts the UEOT in a vertical position which powers on the EOT processor. The microprocessor driven control circuit 61 sends a signal to the microcontroller 35. The microcontroller 35 in turn powers on the "neuron" microprocessor 33 and transceiver 32 which then "listens" for the HEU beacon. If the UEOT "hears" the HEU beacon within a first predetermined time period, it responds at a predetermined rate for a second predetermined time period. If the HEU receives the EOT response during this second predetermined time period, it applies the train line 230 VDC power. If the UEOT does not "hear" the HEU beacon, the microcontroller 35 will power down the "neuron" microprocessor 33 for a predetermined period of time and then the power on/listen cycle will repeat. This is an optional power saving technique.

The operator sees the marker activated for a predetermined period of time, the brake pipe pressure displayed, and the ECP message displayed. Standard arming procedure is initiated by an operator at the UEOT pushing a test/arm button, and the engineer then can arm the UEOT for emergency operation within a predetermined window. After this initial power on sequence, the UEOT operates in one of three modes: standard, ECP, or 74 V emulation. The UEOT automatically switches to the appropriate mode of operation as described below.

In the standard mode, the UEOT functions as a normal EOT with the additional activation of the microcontroller 35 and periodic activation of the "neuron" microprocessor 33 as described above to listen for HEU beacons. While in the standard mode, EOT radio transmissions are sent to the HEU periodically. The microprocessor driven control circuit 61 enters standard mode upon power up and stays in standard mode until it receives a predetermined sequence of messages within a predetermined period of time from the microcontroller 35. This sequence of messages indicates HEU beacons are being sent in ECP mode.

In the ECP mode, the UEOT provides ECP end-of-train status transmissions at a predetermined rate on the train line. These transmissions contain the prescribed train line voltage, marker status, brake pipe pressure, and battery capacity information from the EOT processor. The UEOT enters the ECP mode when "neuron" microprocessor communications is established with the HEU or when standard ECP level train line power is turned on. The UEOT will continue in the ECP mode as long as train line power is applied or HEU beacons are received. EOT radio transmissions to the HEU are suspended as long as the EOT is in the ECP mode. The UEOT will return to standard mode if both the train line power and the HEU beacons are not detected after a time interval. The return to standard mode includes monitoring for train line power and cyclically monitoring for HEU beacons. UEOT radio transmissions to the HEU being again once the HEU beacons cease.

In the 74 V emulation mode, the UEOT monitors for failure messages from the cars and relays these to the HEU via radio communications. Entry into this mode may be controlled by either radio or ECP commands from the HEU.

Figure 7:
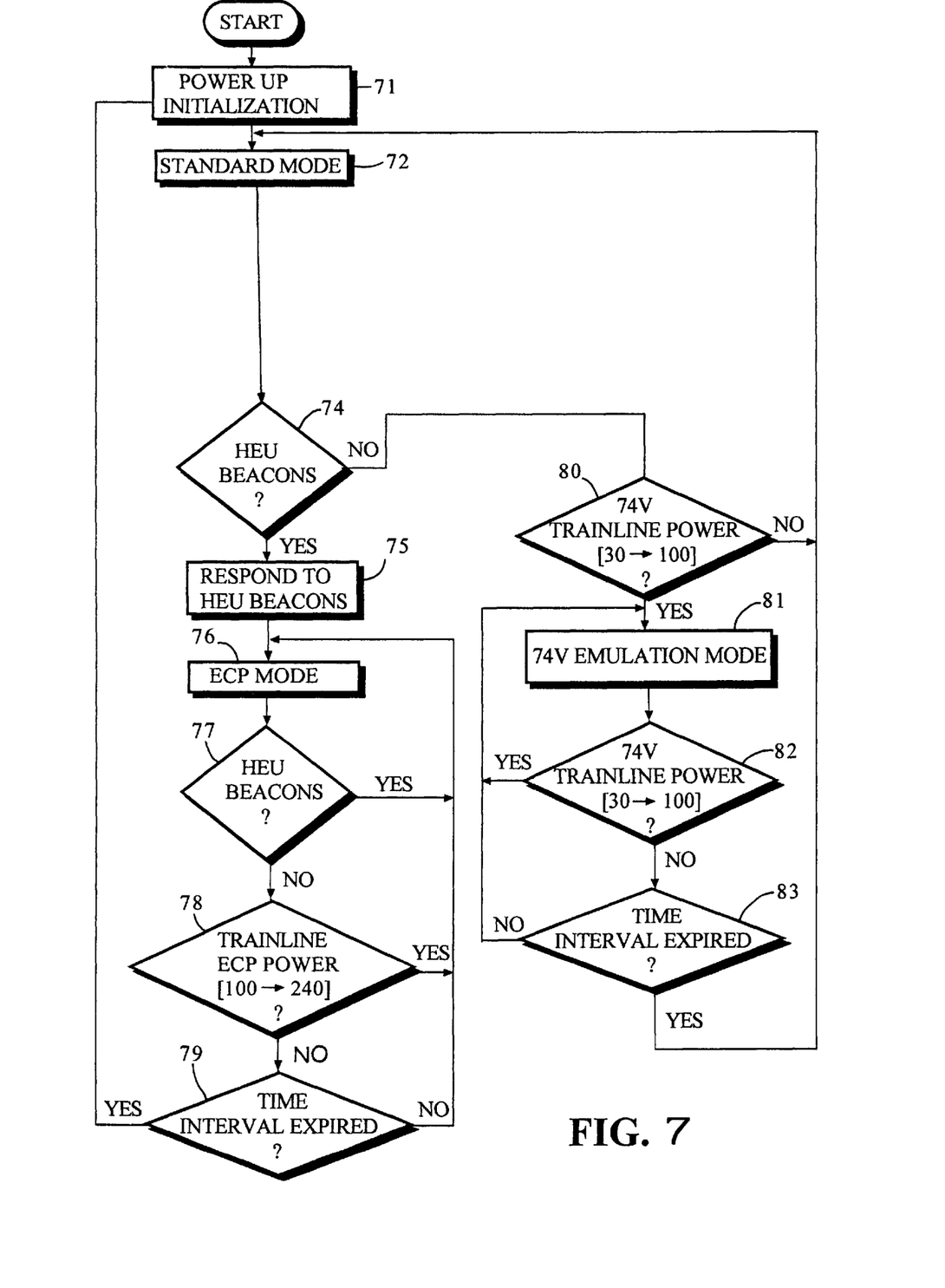
FIG. 7 is a flow chart showing the operation of the UEOT shown in FIG. 6.

FIG. 7 is a flow chart illustrating the logic of the UEOT firmware. The process starts by a power up initialization in function block 71, which occurs when the UEOT is mounted vertically. This initialization includes powering on the microcontroller 35 and, in turn, the "neuron" microprocessor 33. After power up initialization, the UEOT enters the default standard mode in function block 72. A test is made in decision block 74 to determine if the UEOT hears the HEU beacon. If so, the UEOT responds to the HEU via the transceiver 32 in function block 75 and enters the ECP mode in function block 76. As described above, entering the ECP mode includes (1) turning off the radio transceiver, (2) maintaining marker light function, and (3) sending pressure information via the microcontroller 35 and transceiver 32.

While in the ECP mode, a series of tests are made to determine whether the UEOT should remain in the ECP mode. The first of these in decision block 77 is to determine whether HEU beacons are being received. If so, the UEOT remains in the ECP mode. If no HEU beacons have been received for a predetermined period of time, a further test is made in decision block 78 to determine if train line power in the range of 100 to 240 VDC is still being applied. If so, the UEOT remains in ECP mode. If no HEU beacons are detected and sufficient train line power is not detected, a further test is made in decision block 79 to determine if a predetermined time interval has expired. If so, the process loops back to function block 72 where the UEOT again enters the default standard mode where a test is made in decision block 74 to determine if HEU beacons are detected. If not, a test is made in decision block 80 to determine if 74 VDC train line power is detected. 74 VDC train line power is detected when power in the range of 30 to 100 VDC is detected. If not, the process loops back to function block 72; otherwise, the UEOT enters 74 V emulation mode in function block 81.

The 74 V emulation mode is for the case where the UEOT is connected to a train not equipped with the 230 VDC ECP power. In this mode, the UEOT takes its power from the train line but otherwise operates in standard mode. While in the 74 V emulation mode, the UEOT continues to test the train line for 74 VDC train line power in decision block 82. If 74 VDC train line power is not detected for more than a predetermined period of time as determined in decision block 83, the process loops back to function block 72 where the UEOT again enters the default standard mode.

Combining the teachings of the first and second aspects of the invention, and adapter can be provided which converts a standard EOT to a UEOT. This adapter is mounted in the battery compartment of the standard EOT, but instead of converting the standard EOT to an ECP EOT, the adapter converts the standard EOT to a UEOT, providing all the functionality of the UEOT as described above. The block diagram for the UEOT adaptor is basically the same as that of the adaptor shown in FIG. 3 with the difference in functionality being in the firmware of the adaptor. As with the UEOT, the DC to DC converter 31 is a dual voltage unit which can be connected to a 230 VDC ECP train line or a 74 VDC non-ECP train line so that the 74 V emulation mode is also supported by the adaptor.

Figure 8:
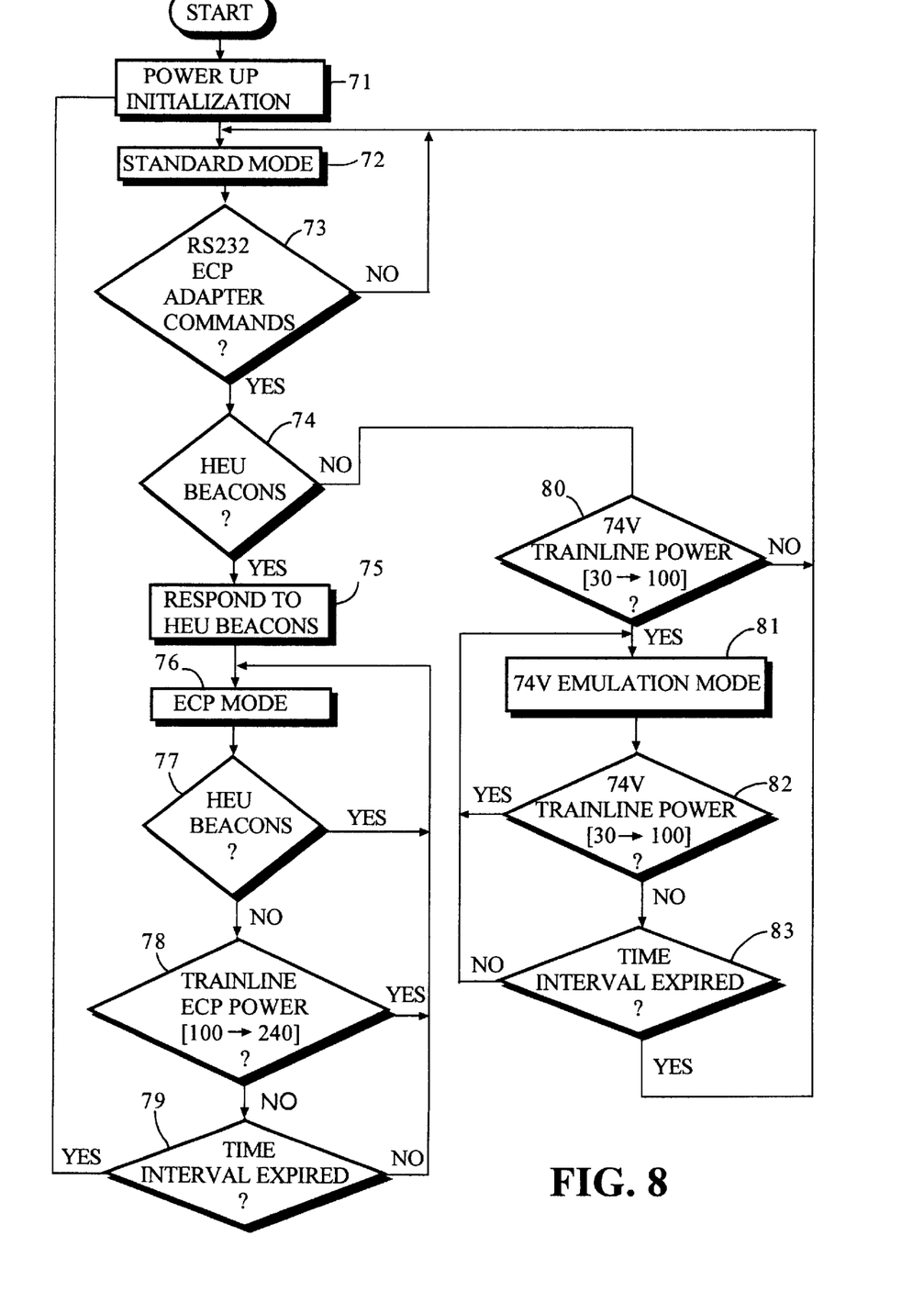
FIG. 8 is a flow chart, similar to the flow chart of FIG. 7, showing the operation of the UEOT adapter.

FIG. 8 is a flow chart showing the process implemented in the UEOT adaptor. This process is essentially identical with that of UEOT as shown and described with respect to FIG. 7 with the addition of decision block 73 inserted between function block 72 and decision block 74. After entering the default standard mode, a test is made in decision block 73 to determine if any serial connection (e.g., RS232) ECP adaptor commands have been received. This test is a test added for the purpose of communication between the UEOT adaptor and the standard EOT microprocessor via the transceiver 38 (FIG. 3).

While the invention has been described in terms of preferred embodiments, those skilled in the art will recognize that the invention can be practiced with modification within the spirit and scope of the appended claims.

Having thus described my invention, what I claim as new and desire to secure by Letters Patent is as follows:

1. A multi-function end-of-train unit (EOT) having multiple modes of operation including at least a standard mode and an electrically controlled pneumatic (ECP) mode for use in freight brake systems comprising:

an ECP connector on the EOT and adapted for connection to a train line of an ECP brake system;

a processor in the EOT on power up monitoring for a beacon transmitted by a head end unit (HEU) on the train line;

a transceiver controller by the processor to transmit an ECP EOT status message to the HEU via the train line upon detection of the HEU beacon, the processor switching to ECP mode and thereafter monitoring the train line for HEU beacons and power and if both HEU beacons and power are not detected on the train line for a predetermined period of time, automatically switching to the standard mode, the processor while in the standard mode continuing to monitor for HEU beacons on the train line.

2. The multi-function EOT recited in claim 1 wherein the multiple modes of operation further include an emulation mode, said processor switching to the emulation mode when HEU beacons are not detected and a voltage on the train line is in a predetermined range different than a defined ECP voltage range.

3. The multi-function EOT recited in claim 2 wherein the processor while in the emulation mode continues to monitor the train line for voltage in said predetermined range and if voltage in said predetermined range is not detected for a predetermined period of time, said processor switches back to the standard mode.

4. The multi-function EOT recited in claim 1 further comprising:

a power converter receiving power from the train line and generating operating voltages for the multi-function EOT; and a battery to supply power to the multi-function EOT when there is no power on the train line.

5. The multi-function EOT recited in claim 4 further comprising a diode isolating the multi-function EOT from the battery in case there is a short circuit battery failure.

6. The multi-function EOT recited in claim 4 wherein the battery is a dual battery providing redundancy in the battery power and improving reliability of the unit.

7. The multi-function EOT recited in claim 1 wherein the ECP connector, the processor and the transceiver are implemented in an adapter for mounting in a battery compartment of a two-way end of train unit (EOT) to conform the unit for use in electrically controlled pneumatic (ECP) freight brake systems further comprising an interface for communicating with a microprocessor in the EOT.

8. A universal end-of-train (UEOT) having multiple modes of operation including a standard mode, an electrically controlled pneumatic (ECP) mode, and an emulation mode for use in freight brake systems comprising:

an ECP connector on the UEOT and adapted for connection to a train line of an ECP brake system;

microcontroller means communicating via a transceiver connected to the train line, the microcontroller means monitoring the train line for a head end unit (HEU) transmitted beacon;

EOT processor means communicating with the microcontroller means and, on power up, entering the standard mode and if a predetermined message is received from the microcontroller means indicating that an HEU beacon has been received, switching to the ECP mode, but if a predetermined message is received from the microcontroller means indicating no HEU beacon has been received but that a voltage on the train line is in a predetermined range different than a defined ECP voltage range, switching to the emulation mode.

9. The UEOT recited in claim 8 wherein the microcontroller means and the EOT processor means are implemented with a single microprocessor.

10. The UEOT recited in claim 8 wherein the microcontroller means and the EOT processor means are implemented with separate microprocessors providing additional reliability through redundancy.

11. The UEOT recited in claim 8 wherein the EOT processor while in the emulation mode continues to monitor the train line for voltage in said predetermined range and if voltage in said predetermined range is not detected for a predetermined period of time, said EOT processor switches back to the standard mode.

12. The UEOT recited in claim 8 further comprising:

a power converter receiving power from the train line and generating operating voltages for the UEOT, said power converter accepting input power in two ranges; and a battery to supply power to the UEOT when there is no power on the train line.

13. The UEOT recited in claim 11 further comprising a diode isolating the UEOT from the battery in case there is a short circuit battery failure.

14. The UEOT recited in claim 11 wherein the battery is a dual battery providing redundancy in the battery power and improving reliability of the unit.

15. The UEOT recited in claim 8 wherein the ECP connector, the microcontroller and the transceiver are implemented in an adapter for mounting in a battery compartment of a two-way end of train unit (EOT) to conform the unit for use in electrically controlled pneumatic (ECP) freight brake systems further comprising an interface for communicating between the microcontroller and the EOT processor.

* * * * *